July 11, 1939.　　　E. A. MARTIN　　　2,165,933
SANITARY DISPENSER
Filed May 24, 1938　　　2 Sheets-Sheet 1
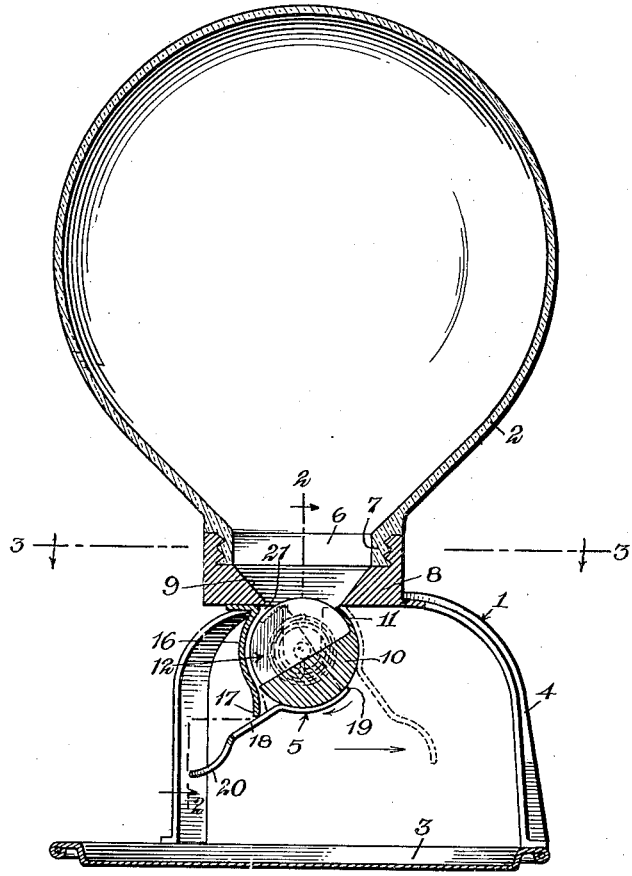
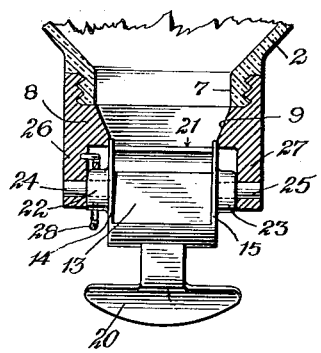
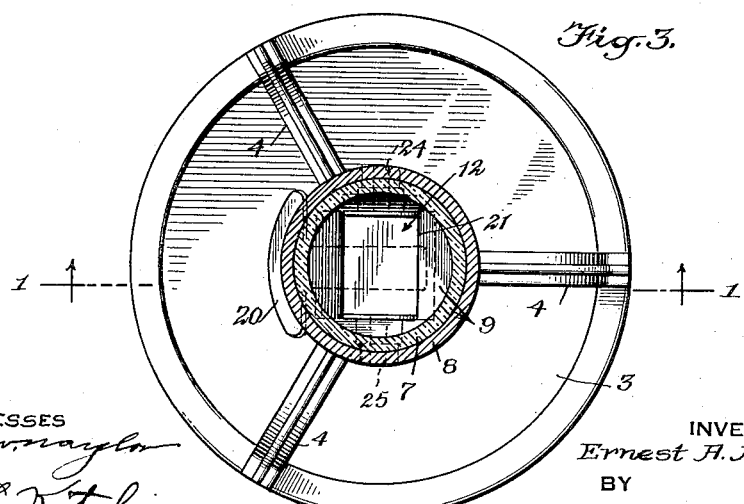
WITNESSES
INVENTOR
Ernest A. Martin
BY
ATTORNEYS

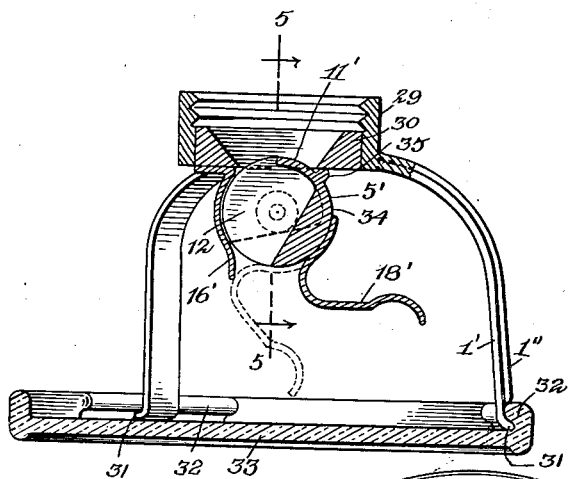
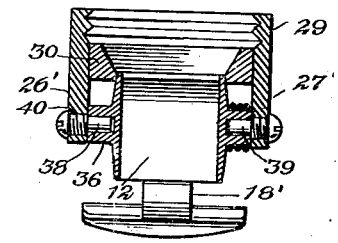
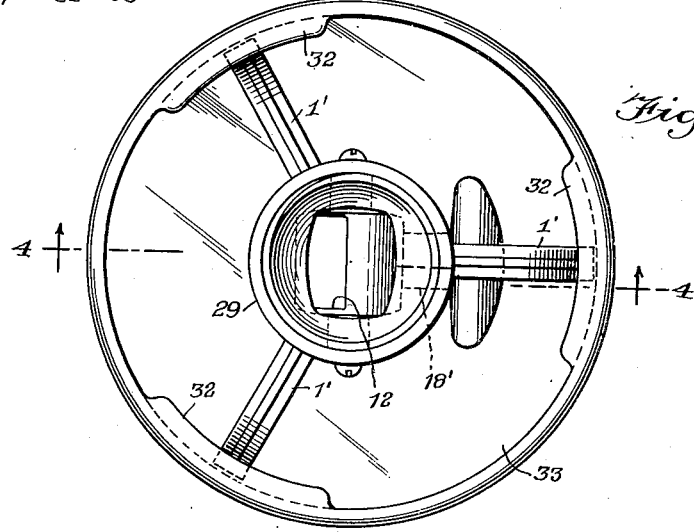

Patented July 11, 1939

2,165,933

UNITED STATES PATENT OFFICE 2,165,933

SANITARY DISPENSER

Ernest A. Martin, New York, N. Y.

Application May 24, 1938, Serial No. 209,695

3 Claims. (Cl. 221—106)

This invention relates to dispensers and particularly to an improved sanitary dispenser wherein the material to be dispensed will remain in a clean sanitary condition until actually discharged from the device.

An object of the invention is to provide an improved simple construction for dispensing different articles and maintaining the undispensed articles in their original sanitary condition.

Another object of the invention is to provide a dispensing device for dispensing peanuts, crackers, popcorn, and other food or articles, the structure being such that only the article being dispensed can be touched by the person actuating the device.

A further object, more specifically, is to provide a dispensing device formed of a container of transparent material and a dispensing structure at the bottom thereof adapted to be manually actuated from time to time for dispensing measured quantities of the material in the container.

In the accompanying drawings—

Fig. 1 is a longitudinal vertical sectional view through a dispenser disclosing an embodiment of the invention, the section being taken on the line 1—1 of Fig. 3;

Fig. 2 is a fragmentary sectional view through Fig. 1 approximately on the line 2—2; and Fig. 3 is a transverse sectional view through Fig. 1 approximately on the line 3—3;

Fig. 4 is a view similar to Fig. 1 but showing a modified form of the invention with the container removed, the section being taken on the line 4—4 of Fig. 6;

Fig. 5 is a sectional view through Fig. 4 approximately on the line 5—5; and

Fig. 6 is a plan view of the structure shown in Fig. 1.

Referring to the accompanying drawings by numerals, 1 indicates a dispensing device as a whole provided with a container 2, preferably of transparent material, as for instance glass, a base 3 preferably of metal, a plurality of supporting legs 4, and a dispensing valve 5. The dispensing device may be used at any desired place for dispensing various articles of food while maintaining the undispensed food in a pure sanitary condition.

In certain places, for instance adjacent bars and the like, food is arranged for free distribution to persons patronizing the bar. This arrangement of food permits various persons to touch or handle the food to be taken. In order to prevent contamination of the food in this way, a dispenser, as shown particularly in Fig. 1, has been provided. By the use of this dispenser a person may secure as much of the food in the container 2 as desired but cannot place his fingers in contact with the food until after it has been dispensed.

Referring again to Fig. 1 it will be noted that the container 2 is provided with an enlarged discharge mouth 6, which is provided with an exteriorly threaded thick wall 7, adapted to be screwed into what may be termed a hopper 8 to which the supporting legs 4 are secured though if desired these legs could be made integral with the hopper 8. The hopper 8 is provided with inclined interior walls 9 adapted to discharge into the dispensing valve 5. This valve is formed with a solid section 10 merging into an arc-shaped web or extension 11, and a section 12 having an open space 13 and side walls or flanges 14 and 15.

When the parts are in the position shown in Fig. 1 popcorn or other material in the container 2 will gravitate downwardly and fill the opening or chamber 13. An arc-shaped guard 16 is positioned adjacent the valve 5 and prevents any of the contents of the chamber 13 escaping. This guard is provided with a slightly curved or flaring edge portion 17 against which a handle 18 rests. This handle is welded or otherwise rigidly secured at 19 to the solid section 10 and at the opposite end is widened, as indicated by the numeral 20 in Fig. 2. This widened portion is adapted to be engaged by the fingers as the hand of a person pushes the handle from the position shown in Fig. 1 to the dotted-line position shown in said figure. A swinging movement of the valve 5 as just described will cause the chamber 13 to discharge its contents into the hand of the person pushing the handle 18. At the same time that the valve is moving to a discharge position the arc-shaped extension 11 is moved over to close the lower opening 21 in the hopper 8. As soon as the chamber 13 has been discharged of its contents, the hand of the operator is removed and if additional food or articles are desired the same action is repeated.

Preferably the solid portion 10 is formed integral with the side portions 14 and 15 and also integral with the bosses 22 and 23. Journal pins 24 and 25 are fitted into the bosses 22 and 23 and these journal pins are rotatably mounted in depending legs 26 and 27 preferably formed integral with the hopper 8 though not necessarily so. A coil spring 28 has one end embedded in the leg 26 and the other end rigidly secured to the boss 22. The action of this spring is to normally maintain the valve 5 in the position shown in Fig. 1 and to return the valve to this position when moved therefrom and then released.

When considerable food is to be dispensed or given away, a number of the dispensers could be provided with a different article or food in each container: for instance, cheese could be contained in one dispenser; crackers in a second dispenser; popcorn in a third dispenser; peanuts in a fourth dispenser, and other food or articles in further dispensers.

It will be understood, of course, that container 2 and valve 5 could be made of any desired size to accommodate any desired quantity of the articles and also articles of various sizes.

Preferably the legs 4 are welded to the base 3 but they could be secured in some other way. Also preferably the base 3 is in the form of a pan so that if any of the material falls off the operator's hand it will be caught by the pan.

Referring particularly to the modified form shown in Figs. 4, 5 and 6, it will be observed that the legs 1' may be integral with or welded to a tubular member 29 and this member may be welded or otherwise rigidly secured to a cone or hopper structure 30 which is similar to structure 8 in the preferred form of the invention. There have been shown three legs 1' but it will be evident that more legs could be used if desired without departing from the spirit of the invention. These legs are preferably strengthened by a reinforcing rod 1'' and are formed at their lower ends with outwardly extending end portions 31 adapted to hook under the overhanging ledges 32, as illustrated in Fig. 3. As illustrated in Fig. 3 there are three legs and three overhanging portions 32. The end portion 31 may be swung into position or may be slid into position from one side of the respective ledges 32. While the base 33 may be metal or other desired material it has been shown as glass or other vitreous substance and of some appreciable thickness to produce a desired weight whereby the device will remain stationary when the handle 18' is swung to the dotted position shown in Fig. 4. This handle is welded or otherwise rigidly secured to the thickened portion 34 of the valve 5' so as to readily swing the valve, and this valve is formed with a pocket 12' for receiving peanuts or other articles to be vended. As shown in Fig. 4, this valve is also provided with an extending portion 11' but by reason of the stop 35 the portion 11' will not completely close the opening in the member 30 but will close the opening sufficiently to prevent the peanuts or similar articles from passing through the valve, though the space between the solid portion 34 and the guard 16' will be sufficient to allow the peanuts or other articles to readily fall into the hand of a person pushing the handle 18'. It will be understood that when the handle 18' is in the dotted position shown in Fig. 4 the valve is closed at the lower end but the peanuts or other articles from the container 2, which is adapted to be screwed into the hopper or ring member 29, will readily pass into the chamber 12. By moving the valve manually over to the full-line position in Fig. 4, the peanuts will be discharged from the valve.

In forming the valve the same may be provided with the journal pins 24 and 25 as shown in Fig. 2, or may be provided with hollow bosses 36 and 37 which receive the pins 38 and 39. Preferably each of these pins is provided with a threaded portion 40 adapted to be screwed into the respective depending ears 26' and 27'.

I claim:

1. In a sanitary dispenser for dispensing peanuts and the like provided with a container, a plurality of legs for supporting said container, and a base for supporting and holding said legs in position, said base being provided with an overhanging shoulder member for each leg and each leg being provided with an extension slidingly fitting into the respective overhanging members.

2. A sanitary dispenser comprising a container having an exteriorly threaded discharge member, a support for said container including an interiorly threaded tubular member secured on to said discharge member, a hopper positioned within one end of said tubular member, said hopper having an outlet and an arc-shaped depending guard, said tubular member having a pair of depending ears, a valve rotatably carried by said ears and positioned adjacent said guard, said valve being provided with a chamber for receiving articles from said hopper, said valve having a pair of end plates and a bottom member having an extending flange, said guard being positioned to close said chamber until said flange and bottom member close the outlet from said hopper, a manually actuated member for rotating said valve to an open position and a spring for rotating said valve to a closed position.

3. A sanitary dispenser comprising a container having a tubular outlet, a support for said container having a tubular member having an outlet, said tubular member fitting over said tubular outlet, an arc-shaped guard depending from said tubular member, said tubular member having a pair of depending ears, a rotatable valve having a chamber, a bottom merging into an arc-shaped flange, a pair of end plates and a journal member extending from each of said plates, said journal members being rotatably supported by said ears, said guard being positioned to prevent the discharge of articles from said chamber until the valve has rotated and until said arc-shaped flange and said bottom have closed the outlet from said tubular member, said bottom being provided with a projection adapted to strike said tubular member for limiting the opening of said valve, a hand-actuated member secured to said bottom for opening said valve, said hand actuated member being positioned to engage said guard when the valve has closed.

ERNEST A. MARTIN.